(12) United States Patent
Amini et al.

(10) Patent No.: US 12,476,102 B2
(45) Date of Patent: Nov. 18, 2025

(54) MULTI-LAYER ION TRAP ON SHAPED GLASS OR DIELECTRIC SUBSTRATE

(71) Applicant: IonQ, Inc., College Park, MD (US)

(72) Inventors: Jason Madjdi Amini, Takoma Park, MD (US); Jonathan Albert Mizrahi, Silver Spring, MD (US); Jeremy Matthew Sage, Acton, MA (US); James Walker Steere, College Park, MD (US)

(73) Assignee: IonQ, Inc., College Park, MD (US)

( * ) Notice: Subject to any disclaimer, the term of this patent is extended or adjusted under 35 U.S.C. 154(b) by 401 days.

(21) Appl. No.: 18/302,572

(22) Filed: Apr. 18, 2023

(65) Prior Publication Data

US 2023/0343577 A1 Oct. 26, 2023

Related U.S. Application Data

(60) Provisional application No. 63/333,781, filed on Apr. 22, 2022.

(51) Int. Cl.
*H01J 49/42* (2006.01)
*G06N 10/40* (2022.01)

(52) U.S. Cl.
CPC ............ *H01J 49/424* (2013.01); *G06N 10/40* (2022.01)

(58) Field of Classification Search
CPC .............................. H01J 49/424; G06N 10/40
See application file for complete search history.

(56) References Cited

U.S. PATENT DOCUMENTS

| | | |
|---|---|---|
| 11,056,332 B1 | 7/2021 | Maunz et al. |
| 2017/0316335 A1* | 11/2017 | Kim ...................... H10N 99/05 |
| 2022/0084709 A1 | 3/2022 | Hughes |
| 2022/0102301 A1* | 3/2022 | Roessler ............ H01J 49/0018 |

FOREIGN PATENT DOCUMENTS

WO 2015128438 A1 9/2015

OTHER PUBLICATIONS

Andrius Marcinkevicius et al., "Femtosecond laser-assisted three-dimensional microfabrication in silica", Mar. 1, 2001, vol. 26, No. 5, Optics Letters, pp. 277-279.
International Search Report and Written Opinion in PCT/US2023/019080, mailed Jun. 29, 2023, 14 pages.

* cited by examiner

*Primary Examiner* — Nicole M Ippolito
(74) *Attorney, Agent, or Firm* — ARENTFOX SCHIFF LLP

(57) ABSTRACT

Aspects of the present disclosure describe devices trapping devices for use in quantum information processing (QIP) architectures, and more particularly, to the use and fabrication of a multi-layer ion trap on shaped glass or dielectric substrate. A method for fabricating the ion trap is described that includes preparing a back surface of the substrate, building a multi-layer stack on the top surface of the substrate, and completing the back etch to break through the substrate and etching through a metal and dielectric in the multi-layer stack to complete the formation of the ion trap. Shaping of the ion trap may also include trap narrowing features, wings, and/or undercutting. An ion trap fabricated using this approach may be used in a QIP system to trap atomic species provided through a hole in the back of the substrate for use as qubits in quantum operations and computations.

20 Claims, 15 Drawing Sheets

MULTI-LAYER ION TRAP ON SHAPED GLASS OR DIELECTRIC SUBSTRATE

CROSS REFERENCE TO RELATED APPLICATIONS

The present application claims priority to and the benefit of U.S. Provisional Patent Application No. 63/333,781, entitled "Multi-Layer Ion Trap on Shaped Glass or Dielectric Substrate," and filed on Apr. 22, 2022, the contents of which are incorporated herein by reference in their entirety.

TECHNICAL FIELD

Aspects of the present disclosure relate generally to trapping devices for use in quantum information processing (QIP) architectures, and more particularly, to the use and fabrication of a multi-layer ion trap on shaped glass or dielectric substrate.

BACKGROUND

Trapped atoms are one of the leading implementations for quantum information processing or quantum computing. Atomic-based qubits may be used as quantum memories, as quantum gates in quantum computers and simulators, and may act as nodes for quantum communication networks. Qubits based on trapped atomic ions enjoy a rare combination of attributes. For example, qubits based on trapped atomic ions have very good coherence properties, may be prepared and measured with nearly 100% efficiency, and are readily entangled with each other by modulating their Coulomb interaction with suitable external control fields such as optical or microwave fields. These attributes make atomic-based qubits attractive for extended quantum operations such as quantum computations or quantum simulations.

It is therefore important to make improvements in the design and fabrication of the traps that are used to handle atomic-based qubits.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

An aspect of this disclosure describes techniques for fabricating multi-layer traps on shaped glass or dielectric substrate. The types of traps fabricated with these techniques include ion traps but need not be so limited. The term shaping may refer to various processes or techniques that physically modify or alter at least a portion of a substrate to produce a desirable form of the substrate. The shaping may involve the formation of a hole through the substrate and/or more substantial shaping such as trap wings, a narrowing of the middle portion of the trap, and/or undercutting. The method includes preparing a glass or dielectric substrate, building a multi-layer stack on the top surface of the glass or dielectric substrate, and etching from the back side to etch fully through the glass or dielectric substrate and/or portions of the multi-layer stack and complete the ion trap.

An aspect of this disclosure describes a method of fabricating a trap that includes preparing a back surface of a substrate for subsequent processing; building, after the preparation of the back surface of the substrate, a stack of multiple layers on a top surface of the substrate, the stack of multiple layers including at least one metal layer for routing and at least one metal layer for top electrodes; and shaping the substrate, after the stack of multiple layers is built on the top surface of the substrate, by processing the back surface of the substrate.

Another aspect of this disclosure describes a QIP system that uses the multi-layer ion trap on shaped glass or dielectric substrate.

An aspect of this disclosure describes a QIP system that includes an ion trap having a substrate made of a glass material or a dielectric material, and a stack of multiple layers disposed over the substrate and including at least one metal layer for routing, at least one dielectric layer, and at least one metal layer for top electrodes, the substrate and the stack of multiple layers being shaped to form a hole that extends through the substrate and through the stack of multiple layers. The QIP system also includes a source configured to provide, from a back surface of the ion trap, atomic species that pass through the hole in the substrate and the stack of multiple layers of the ion trap to a top surface of the ion trap.

An aspect of this disclosure describes an ion trap having a substrate made of a glass material or a dielectric material; and a stack of multiple layers disposed over the substrate and including at least one metal layer for routing, at least one dielectric layer, and at least one metal layer for top electrodes, the substrate and the stack of multiple layers being shaped to form a hole that extends through the substrate and through the stack of multiple layers.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings or figures is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form to avoid obscuring such concepts.

FIGS. 1A-1H illustrate an example of a fabrication process for making a trap with metallization on a shaped glass substrate or shaped dielectric substrate in connection with aspects of this disclosure. The figures provide a diagrammatic representation of the fabrication process and the sizes and thicknesses shown are merely for illustrative purpose and not intended as an accurate representation of the real sizes and thicknesses of the trap features.

The type of metallization process used may be an electroplating process like the ones used in the fabrication of micro-electromechanical systems (MEMS). It is to be understood that, where appropriate, techniques other than an electroplating process may be used for metallization. For example, techniques such as sputtering and/or physical vapor deposition (PVD), or other similar techniques, may be used instead of an electroplating process for at least some of the metallization steps needed as part of this disclosure. While the processes or methods described herein are applicable to traps with multiple metallization layers (e.g., traps that allow for one or more of the metal layers to be used for routing and one of the metal layers to be used for top electrodes), they may also be applicable, in whole or in part, to traps that use a single metallization layer.

Figure 1A:
FIGS. 1A-1H illustrate an example of a fabrication process for making a trap with metallization on a shaped glass substrate or shaped dielectric substrate in accordance with aspects of this disclosure.

FIG. 1A illustrates a substrate 100, also referred to as a wafer or die, that is made of a glass or dielectric material. One example of a material that can be used for the substrate 100 is fused silica (FuSi). Also shown are alignment patterns or marks 110 that are made on the top surface of the substrate 100 using standard fabrication processes. These alignment marks 110 may be used to align subsequent processes performed on the surfaces of the substrate 100.

Figure 1B:
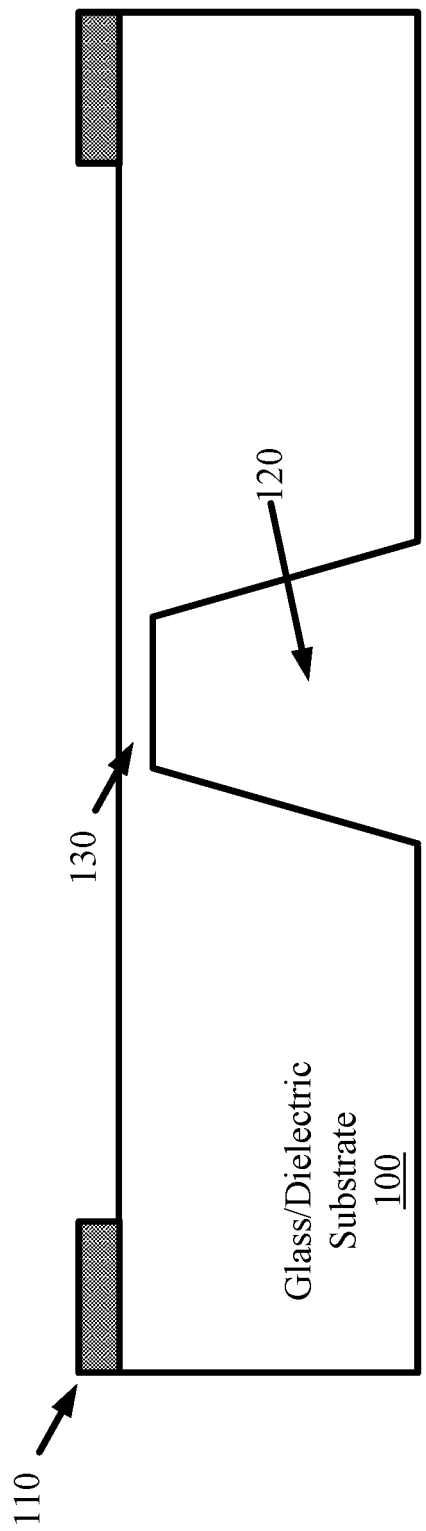

Next, as shown in FIG. 1B, the back surface of the substrate 100 is prepared by laser writing, or similar process, to prepare the wafer for selective etching. Optionally, as shown in FIG. 1B, a partial etching 120 may be performed to what will become a hole from the back surface of the substrate 100 to the front surface of the substrate 100. Examples of the type of selective etching include techniques described in Andrius Marcinkevičius, Saulius Juodkazis, Mitsuru Watanabe, Masafumi Miwa, Shigeki Matsuo, Hiroaki Misawa, and Junji Nishii, "Femtosecond laser-assisted three-dimensional microfabrication in silica," Opt. Lett. 26, 277-279 (2001). Example fabrication sources for this process are Translume (www.translume.com) and Femtoprint (www.femtoprint.ch). The partial etching 120 may involve one or more steps of writing and etching.

If the partial etching is included (as shown in FIG. 1B), a meniscus or thin layer 130 may result from the partial etching. The meniscus 130 may be left to provide mechanical support for subsequent processes to be performed on the top surface of the substrate 100. The thickness of the meniscus 130 may depend on how much of a partial etching 120 was performed (if any). Additionally, or alternatively, the meniscus 130 may be left to reduce topology for high aspect ratio (HAR) lithography used with an electroplating process. Having a flat surface by leaving the meniscus 130 may allow for better photoresist deposition and development. The meniscus 130 may also be prepared by laser writing process for selective etching in later steps. The meniscus 130 may be etched at a later stage when the top surface processes have been completed to complete a hole through the substrate 100.

Figure 1C:
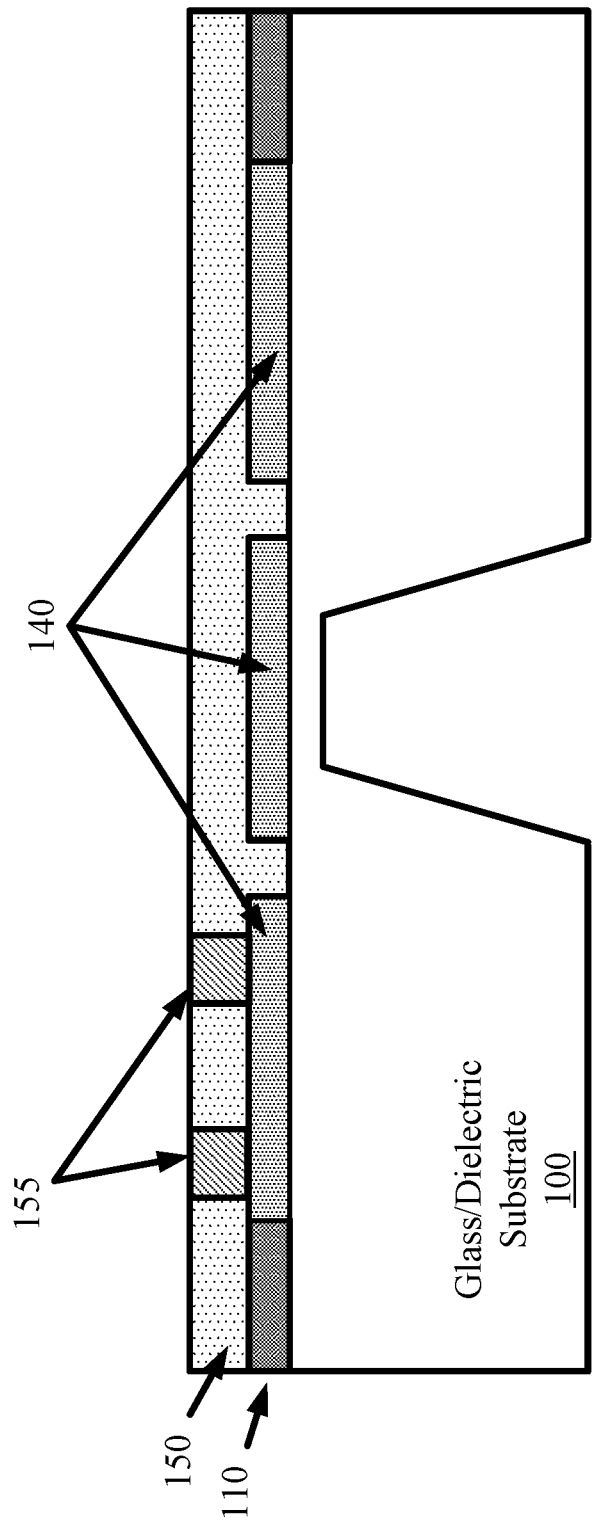

FIG. 1C illustrates next steps performed on the top surface of the substrate 100. These steps may include depositing or forming a patterned or unpatterned metallization layer 140 on the top surface of the substrate 100, followed by depositing or forming a dielectric layer 150. Metallization layer 140 provides a protective etch stop for later processing steps and can also serve as an electrical routing layer. The metallization layer 140 may be referred to as a first metallization layer. An example of a metal used for the metallization layer 140 is chrome or titanium tungsten (Ti Tungsten or TiW). This layer may be a multi-metal stack to improve electrical conductivity or provide further protective benefits; for example, the chrome or titanium tungsten metallization may be covered by a copper metallization for improved electrical conductivity. Dielectric layer 150 may be patterned and filled with a metal or other conductive material to form electrical vias 155 through the dielectric layer 150. Both the dielectric layer 150 and the vias 155 may be planarized using chemical mechanical polishing or other processes to provide a flat or near flat surface for further process steps. Because multiple layers of different materials are deposited or formed on a glass (or dielectric) substrate, the traps described herein may be referred to as multi-layer traps on glass. Moreover, because the glass is shaped by, for example, the partial etching 120 (and subsequently a full etching and perhaps etching in other sections of the substrate 100), the traps described herein may be referred to as multi-layer traps on shaped glass. When the substrate is a dielectric substrate or a glass ceramic substrate, the traps may be referred to as multi-layer traps on shaped dielectric or shaped glass ceramic, respectively.

Figure 1D:
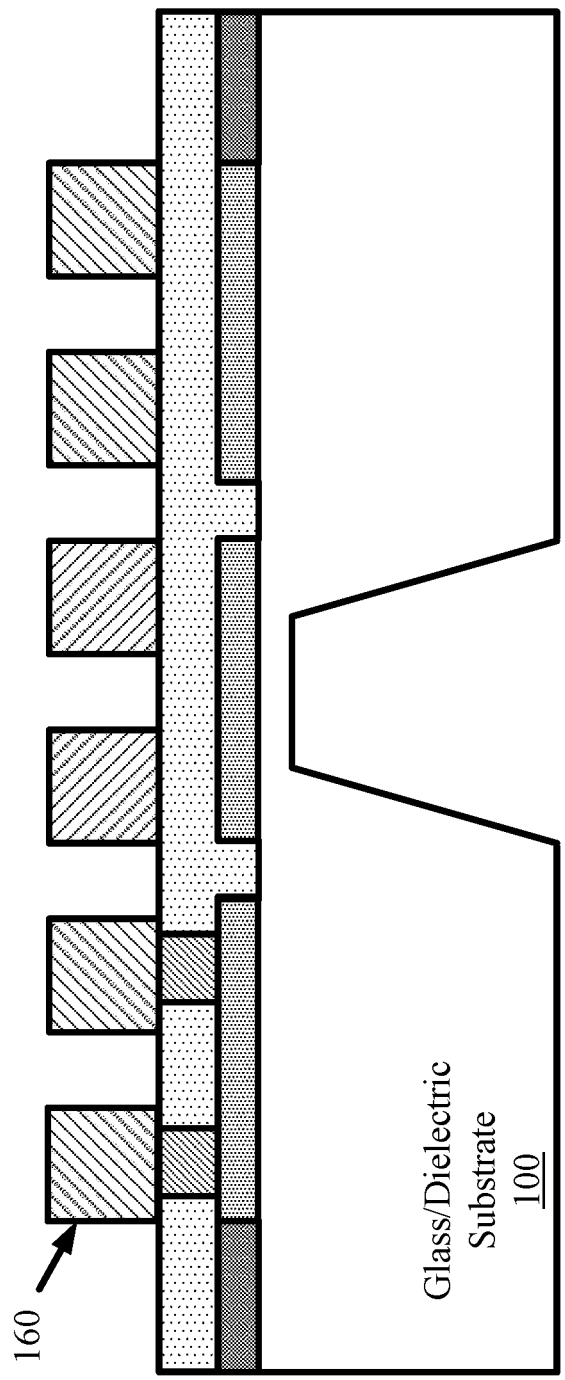

A metallization 160 is then applied on top of the dielectric layer 150, as shown in FIG. 1D, to form top electrodes and/or routing connections for the trap. As mentioned above, the process used for metallization, such as to make the metallization 160, may be an electroplating process like the ones used in the fabrication of MEMS. Moreover, an example of a metal used for the metallization 160 is gold (Au), however other metals or combinations of metals may also be used. When the metallization 160 is the top metal layer of the multi-layer stack or multi-layer structure being built on the top surface of the substrate 100, it may be referred to as the top metallization or the top electroplated metallization (if made with such a process). In an exemplary aspect, the metallization 160 may include a metallization layer (not shown) between the top metallization and the dielectric layer 150 that may or may not be patterned. An example of this metallization layer is the electroplating seed layer used when metallization 160 is formed via electroplating metal. This in-between layer may be etched prior to the following steps or may be left for removal at a later stage in the process.

Figure 1E:
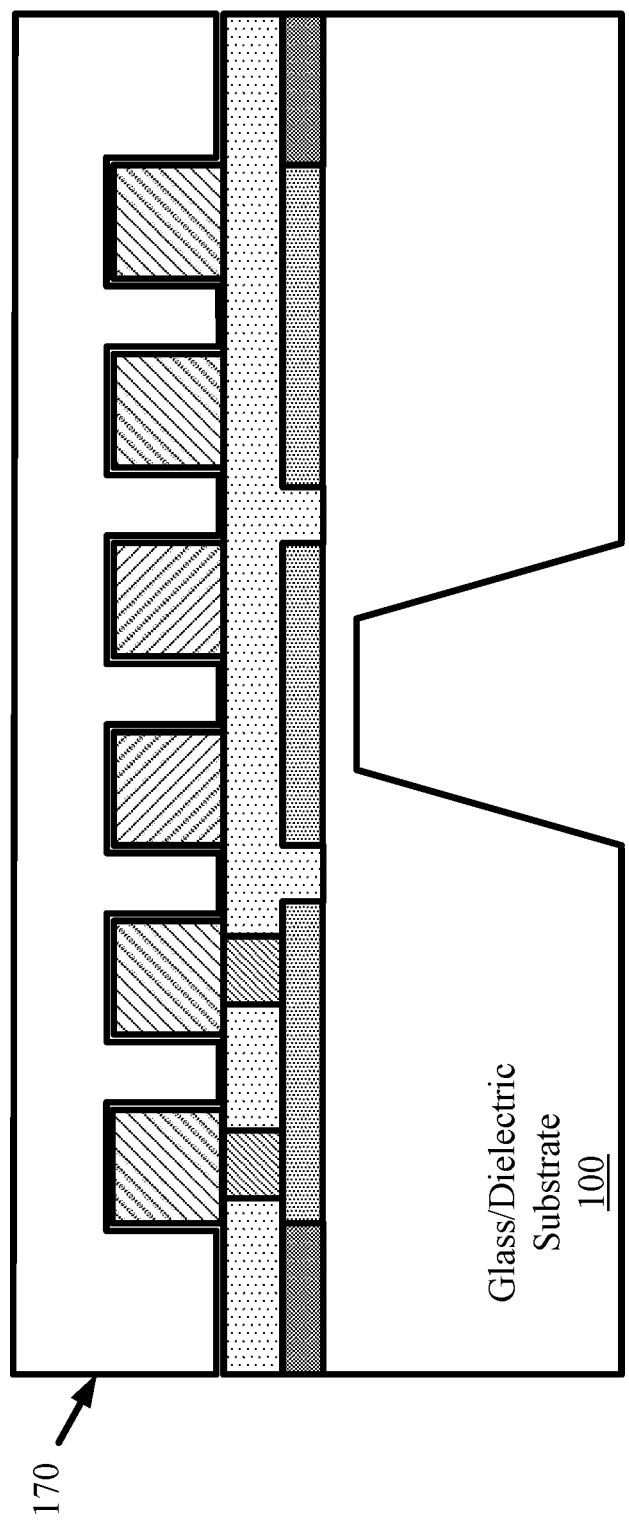

FIG. 1E illustrates the deposition of a temporary protective layer 170 over the metallization 160. The temporary protective layer 170 goes over the structures formed by the metallization 160 and not under the structures. The temporary protective layer 170 may be formed by one or multiple protective layers. This temporary protective layer 170 allows for subsequent etching processes on the back surface of the substrate 100 without affecting the multi-layer stack on the top surface.

Figure 1F:
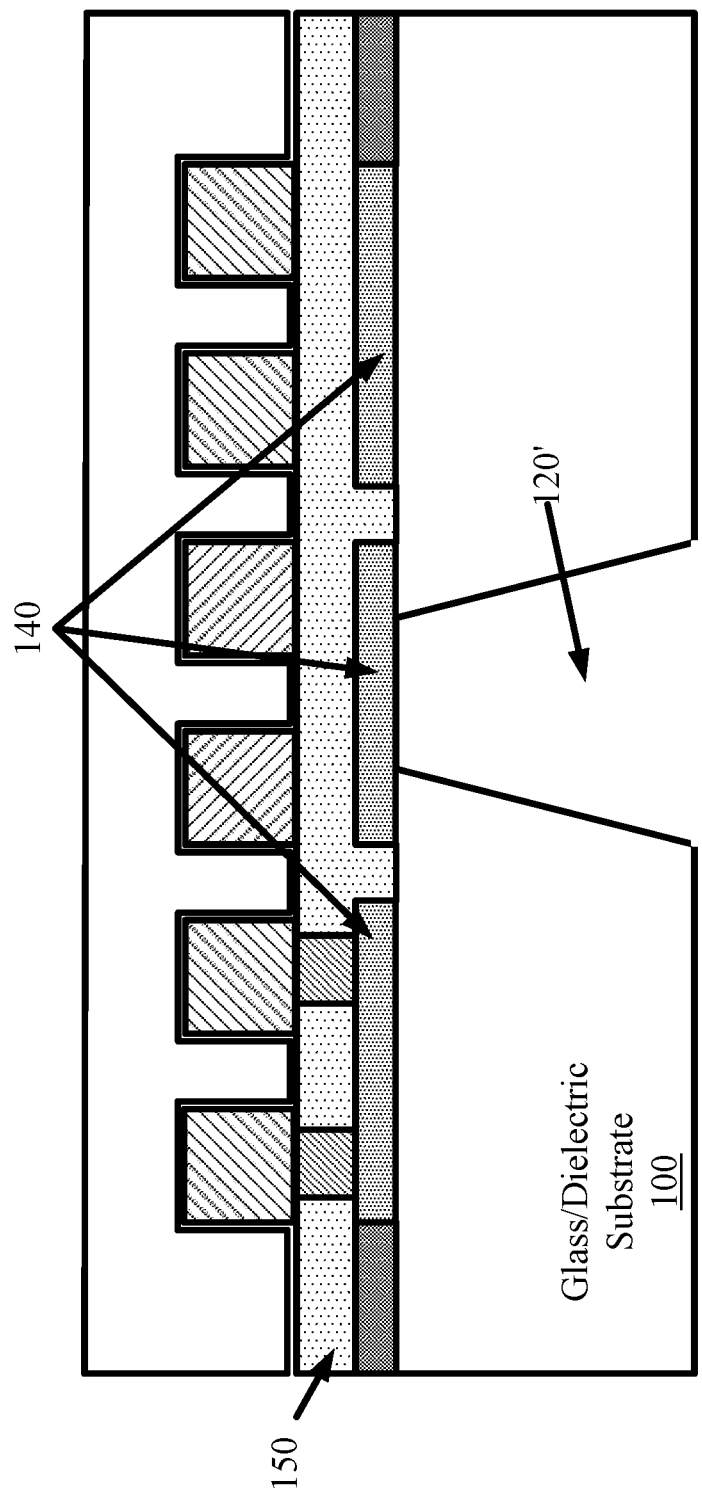

FIG. 1F illustrates the process of taking the partial etch 120 and performing a further etch (e.g., by placing the entire substrate 100 in an acid bath) to break through the meniscus 130 and produce a full etch 120' on the back surface of the substrate 100. If an earlier partial etch was not performed, then this etch will provide the full etch through the substrate 110. The metallization layer 140, also referred to as the protective metallization layer 140, may be used primarily for routing, however, the metallization layer 140 may also be used to contain the back side etching from breaking through and reaching the dielectric layer 150. As a variation, the metallization layer 140 may be patterned to allow for etchant to reach dielectric layer 150 in a designated region above etch 120'. If the meniscus 130, or other regions of the substrate, has been prepared for selective etching during the earlier processing, then the shape of the resulting etch is something that can be controlled. If the meniscus 130 has not been prepared in such a manner, then the etch may be isotropic. The etchant or etch process used for this stage of the fabrication may or may not be the same as the earlier etchant or etch process used for the earlier optional substrate shaping.

Figure 1G:
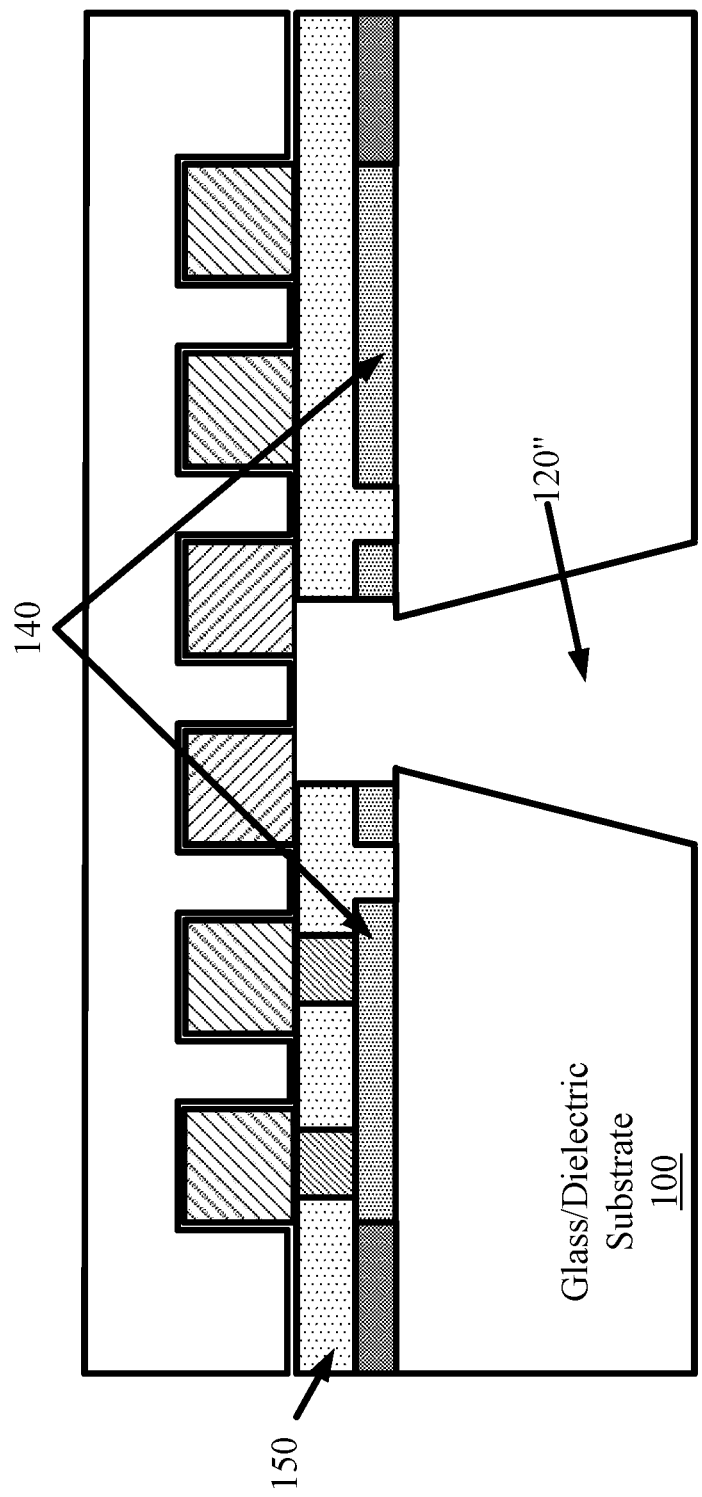

Optionally, the metallization layer 140 may then be etched from the back side to expose the dielectric layer 150. The dielectric layer 150 may then be etched to complete the hole 120" through the full substrate and deposited layers as shown in FIG. 1G. This way, there is a hole that connects the back surface to the top surface, and the hole is properly aligned by using the alignment marks 110 (see FIG. 1A) during the various processes described above. An example of such a hole is a hole used to load atomic species from the back of the substrate 100 to the top surface of the trap for trapping and using them for qubits in quantum operations and computations.

Figure 1H:
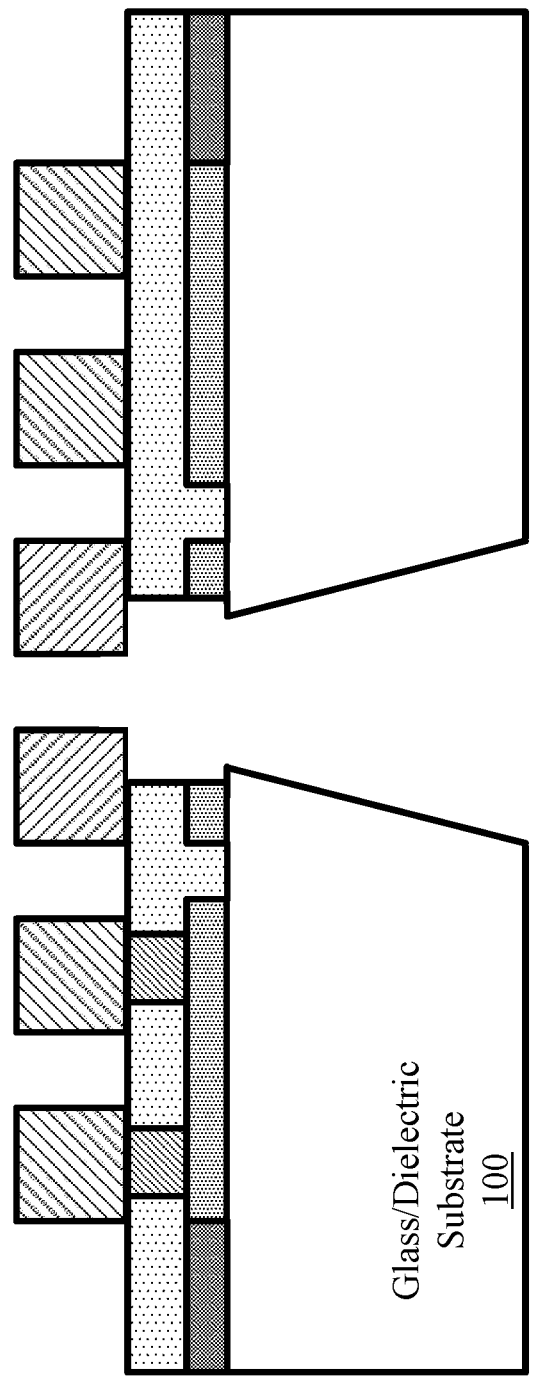

Once the break though is achieved, the temporary protective layer 170 may be removed as shown in FIG. 1H. At this point additional protective layers and etching from the front side may be used to cut holes in the dielectric layer 150 and the metallization layer 140. For example, if the optional back side etch through the metallization layer 140 and the dielectric layer 150 were not performed, then a front side etch, which may include a patterned protective layer to limit the etch to particular regions, can complete the full etch through the device.

The fabrication techniques described above address some of the incompatibilities of using a glass shaping or etching process along with processes such as the ones used in MEMS fabrication. To be able to create the multi-layer stack, it is helpful but not always necessary for the top surface of the substrate 100 to be pristine and without holes and may not work as well with the holes in the surface created by the etching process if such a process were to be applied all the way to the top surface. Moreover, the back etching process cannot be entirely performed after the multi-layer stack is built on the top surface of the substrate 100 because the laser writing process may damage or destroy the multi-layer stack. As such, the techniques described herein involve the preparation of the substrate (that may include a partial etch), the buildup of the multi-layer stack on the top surface, and the final etch from the back surface to the front while the front surface is protected from the acids (or other process) used to shape the substrate by removing the laser written regions of the substrate or the unprepared substrate (for example, the meniscus 130) or a combination of the two.

Figure 2A:
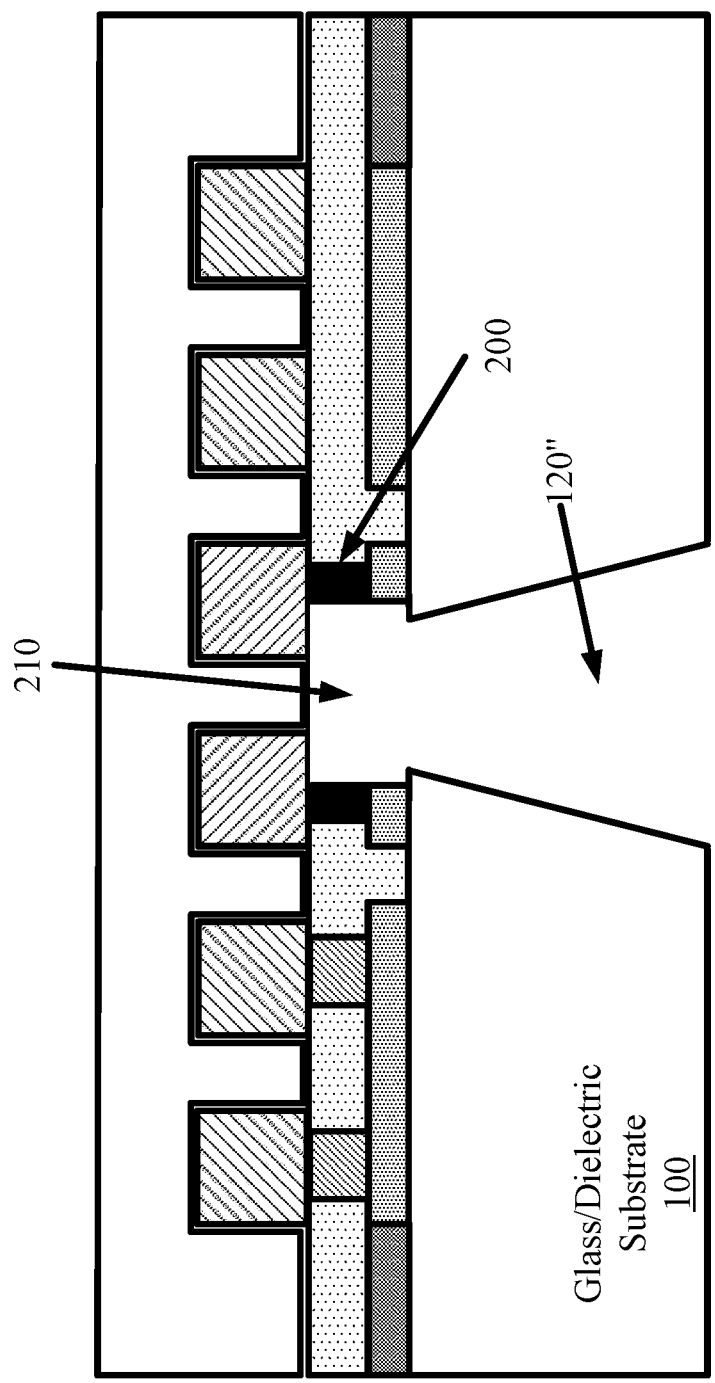
FIGS. 2A and 2B illustrate an example of using dams to limit the deleterious effects of etching on the device in accordance with aspects of this disclosure.

FIG. 2A illustrates an example of using dams or vias 200 through the dielectric layer 150 to limit the extent of the etch through the dielectric layer 150 to the region 210. The dams or vias 200 may encircle the top extent of etch 120" or may only enclose a portion of the etch. Without these protective dams or vias 200, etching through the dielectric layer 150 may be limited by only the etch time if using an acid. This can impose design limitations to prevent excessive undercutting of the metallization 160 while still completing the etch through the dielectric layer 150.

Figure 2B:
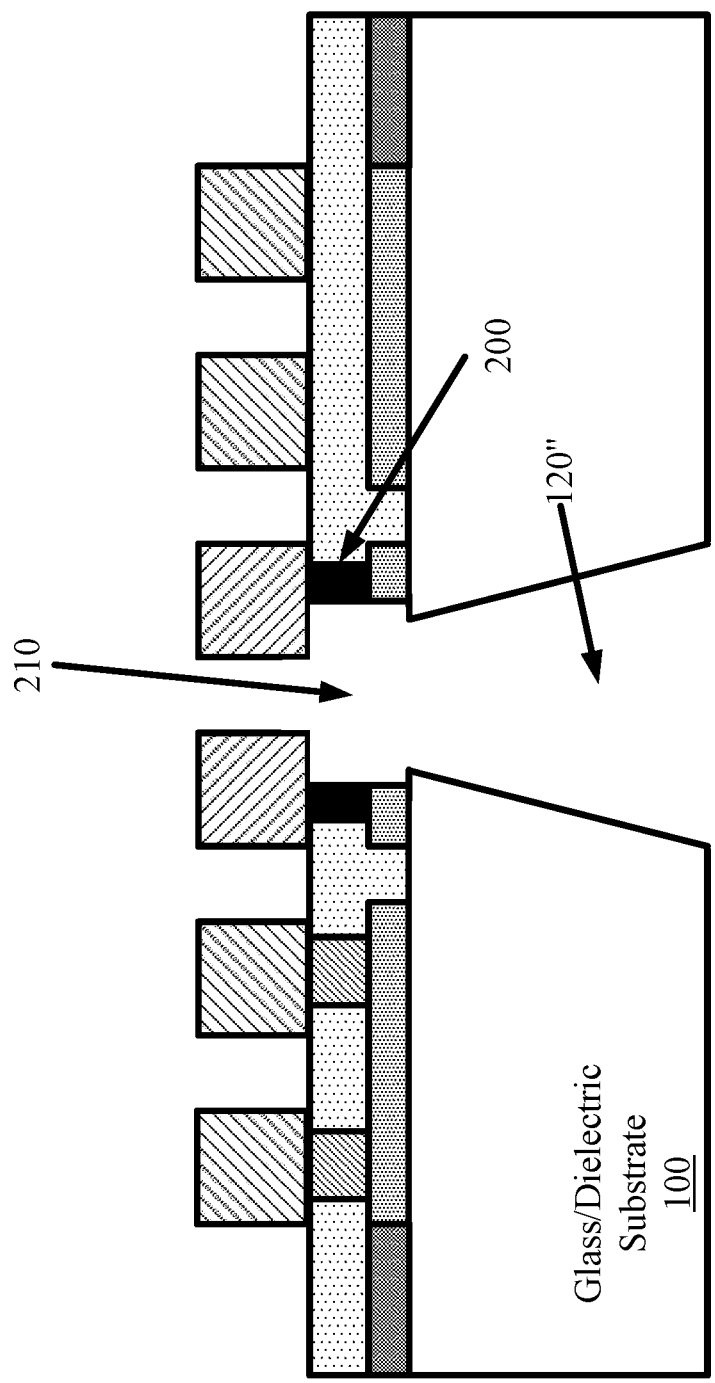

FIG. 2B illustrates an example where the trap structure shown in FIG. 2A has its temporary protective layer (e.g., the temporary protective layer 170) removed. This figure also illustrates the full etch through the device (e.g., see FIG. 1H).

Figure 3A:
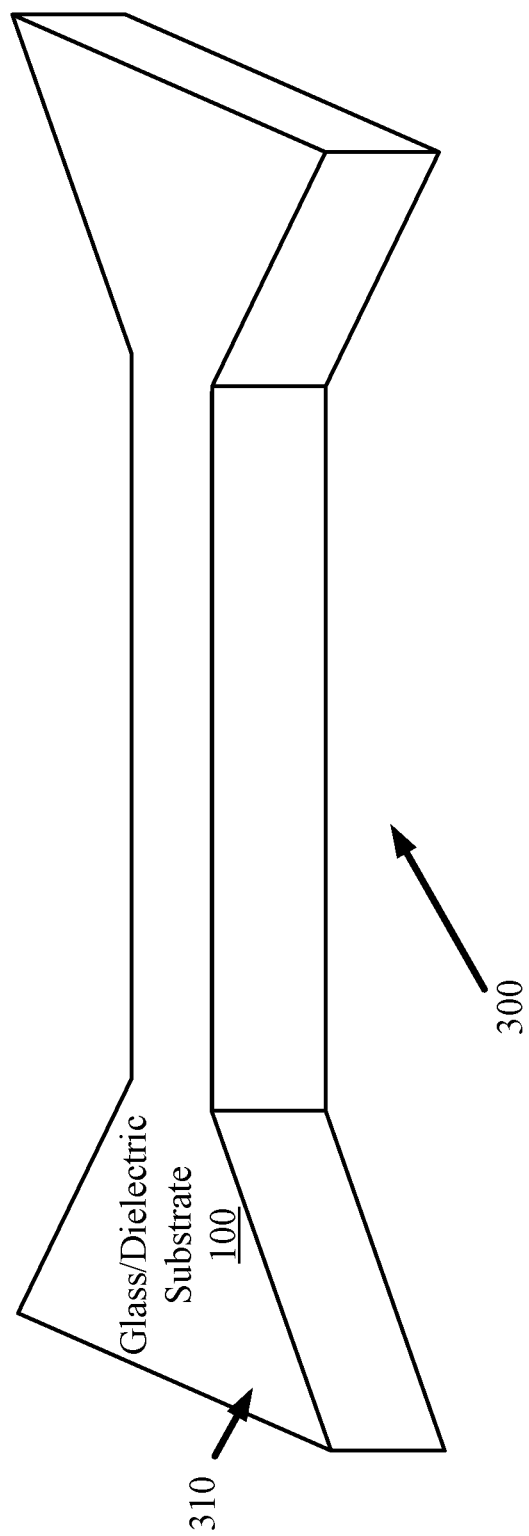
FIGS. 3A and 3B illustrate examples of other shaping of a glass substrate or dielectric substrate in accordance with aspects of this disclosure.
Figure 3B:
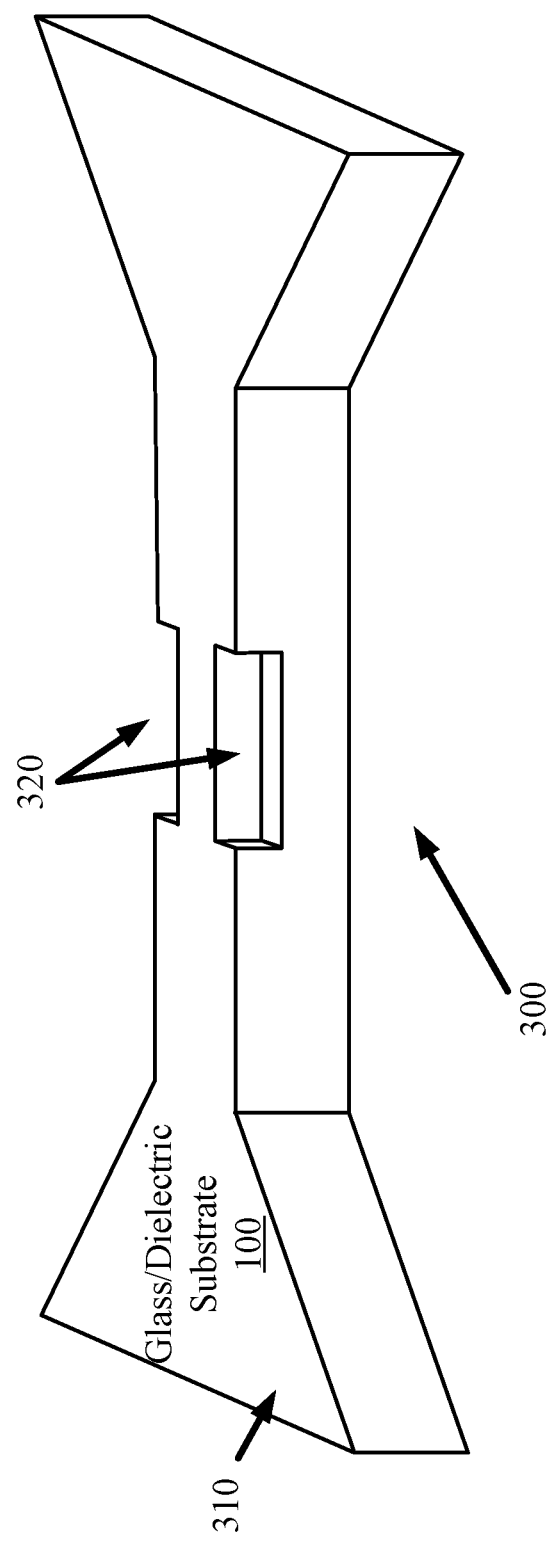

While FIGS. 1A-2B illustrate an example of using substrate shaping to provide a hole in a glass or dielectric substrate (or glass ceramic substrate), the techniques described above can be applied to multi-layer on glass traps that involve additional or alternative shaping. FIGS. 3A and 3B illustrate examples of other shaping of a glass substrate or dielectric substrate in accordance with aspects of this disclosure.

For example, FIG. 3A shows the substrate 100 in which glass shaping is used to produce a narrowing of a trap 300 and/or wings 310. The trap 300 is shown to be narrow in the middle and wings 310 are formed at both ends of the trap 300. These features enable the trap to provide improved optical compatibility and system integration. Accordingly, a process that involves a back surface preparation, a top surface multi-layer stack build up, and a final back surface etch as described herein may be used to produce a shaped trap like the one shown in FIG. 3A.

In another example, FIG. 3B shows the substrate 100 in which glass shaping produces a narrowing of a trap 300, wings 310, and/or under cuttings 320. Like in FIG. 3A, the trap 300 is shown to be narrow in the middle, with wings 310 formed at both ends of the trap 300, and with the addition of under cuttings 320 at both sides of the middle portion of the trap 300. The form or geometry of the under cuttings 320 is provided by way of illustration and not of limitation and other forms or geometries may also be used. These features enable the trap to provide improved optical compatibility (e.g., compatibility with the bean waist of optical beams) and system integration. Accordingly, a process that involves a back surface preparation, a top surface multi-layer stack build up, and a final back surface etch as described herein may be used to produce a shaped trap like the one shown in FIG. 3B.

Figure 4:
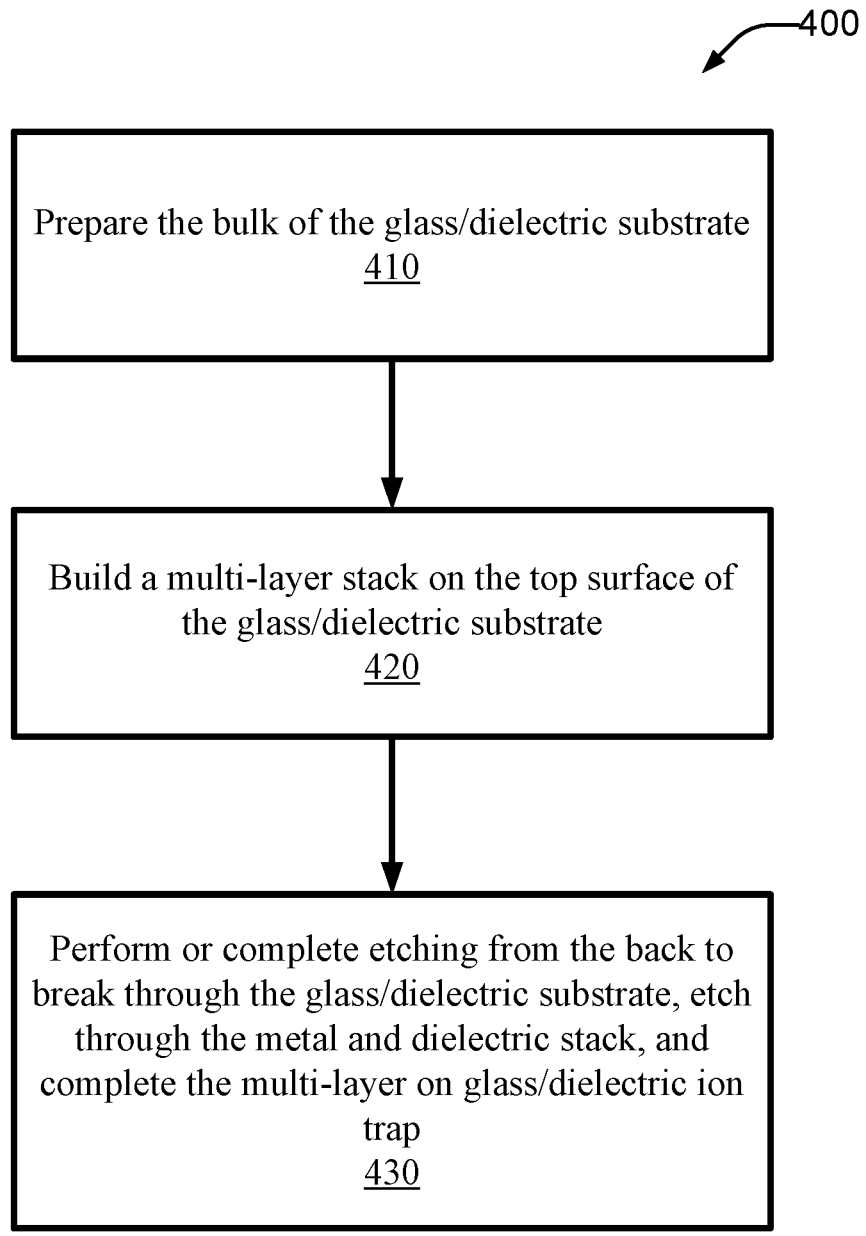
FIG. 4 illustrates a flow diagram of a method for making a trap with metallization on a shaped glass substrate or shaped dielectric substrate in accordance with aspects of this disclosure.

FIG. 4 illustrates a flow diagram of a method 400 for making a trap with metallization on a shaped glass substrate or shaped dielectric substrate in accordance with aspects of this disclosure.

Once a glass or dielectric substrate is provided, the method 400 may include, at 410, preparing the bulk of the glass or dielectric substrate (e.g., the substrate 100). The preparation may include one or more of the steps described above in connection with FIGS. 1A and 1B.

The method 400 may include, at 420, the building (e.g., disposing or depositing) of a multi-layer stack on the top surface of the glass or dielectric substrate. The building may include one or more of the various steps described above in connection with FIGS. 1C-1E.

The method 400 may include, at 430, the performing or completing of the etching from the back to break through the glass or dielectric substrate and complete the ion trap. This may include etching through a portion of the multi-layer stack from the back side to make a hole the full thickness of the substrate 100 and the multi-layer stack. Completion of the etching may include the steps described above in connection with FIGS. 1F and 1G.

Additionally, the method 400 may include removing a temporary protective layer (e.g., the temporary protective layer 170) as illustrated in FIGS. 1H and 2B, and/or performing additional etching through the metallization layer 140 and the dielectric layer 150.

Additionally, the method 400 may include forming dams or vias (e.g., the dams 200) in the dielectric layer to limit the extent of the etch through the dielectric layer.

An aspect of this disclosure describes a method (e.g., the method 400) of fabricating a trap that includes preparing a back surface of a substrate for subsequent processing; building, after the preparation of the back surface of the substrate, a stack of multiple layers on a top surface of the substrate, the stack of multiple layers including at least one metal layer for routing and at least one metal layer for top electrodes; and shaping the substrate, after the stack of multiple layers is built on the top surface of the substrate, by processing the back surface of the substrate.

For this method, the substrate may be made of a glass material or a dielectric material.

For this method, the substrate may be made of fused silica.

For this method, preparing the back surface of the substrate includes applying at least one laser writing step to prepare the back surface of the substrate for selective etching.

For this method, preparing the back surface of the substrate includes partially shaping the substrate by removing, from the back surface of the substrate, a portion of the substrate. Moreover, removing the portion of the substrate includes applying one or more laser writing steps and one or more etching steps. Additionally or alternatively, removing the portion of the substrate leaves a meniscus near the top surface of the substrate. Additionally or alternatively, preparing the back surface of the substrate includes applying one or more laser writing steps to the meniscus that may prepare the full thickness of the meniscus for later selective etching or may prepare only a portion of thickness for later selective etching. Moreover, the method includes removing the meniscus at a later stage. For example, building the stack of multiple layers includes disposing a protective layer over the stack of multiple layers, and removing the meniscus is performed after the protective layer is disposed over the stack of multiple layers.

For this method, building the stack of multiple layers includes disposing a first metallization over the top surface of the substrate, disposing a dielectric layer over the first metallization, and disposing a second metallization over the dielectric layer, the first metallization being part of the at least one metal layer for routing and the second metallization being part of the at least one metal layer for top electrodes. Disposing the dielectric layer includes forming vias in the dielectric layer to enable connections between the first metallization and the second metallization. Disposing the first metallization includes patterning the first metallization to provide the routing. Disposing the second metallization includes patterning the second metallization to provide the top electrodes. Disposing the first metallization, disposing the second metallization, or both, include an electroplating process. Moreover, the second metallization may be made of gold. Disposing the second metallization includes patterning the second metallization to provide the top electrodes.

For this method, building the stack of multiple layers includes disposing a dielectric layer and disposing two or more metallization layers over the dielectric layer.

For this method, building the stack of multiple layers includes disposing more than two metallization layers.

For this method, building the stack of multiple layers includes disposing a protective layer over the stack of multiple layers, and shaping the substrate by processing the back surface of the substrate includes removing, from the back surface of the substrate, a portion of the substrate to form a hole through a thickness of the substrate. Moreover, shaping the stack of multiple layers by removing a portion of the stack of multiple layers for the hole through the substrate to extend through the stack of multiple layers. The stack of multiple layers includes a dielectric layer with multiple dams, and the hole extending through the stack of multiple layers extends between the dams in the dielectric layer. The method further includes removing the protective layer.

Figure 5:
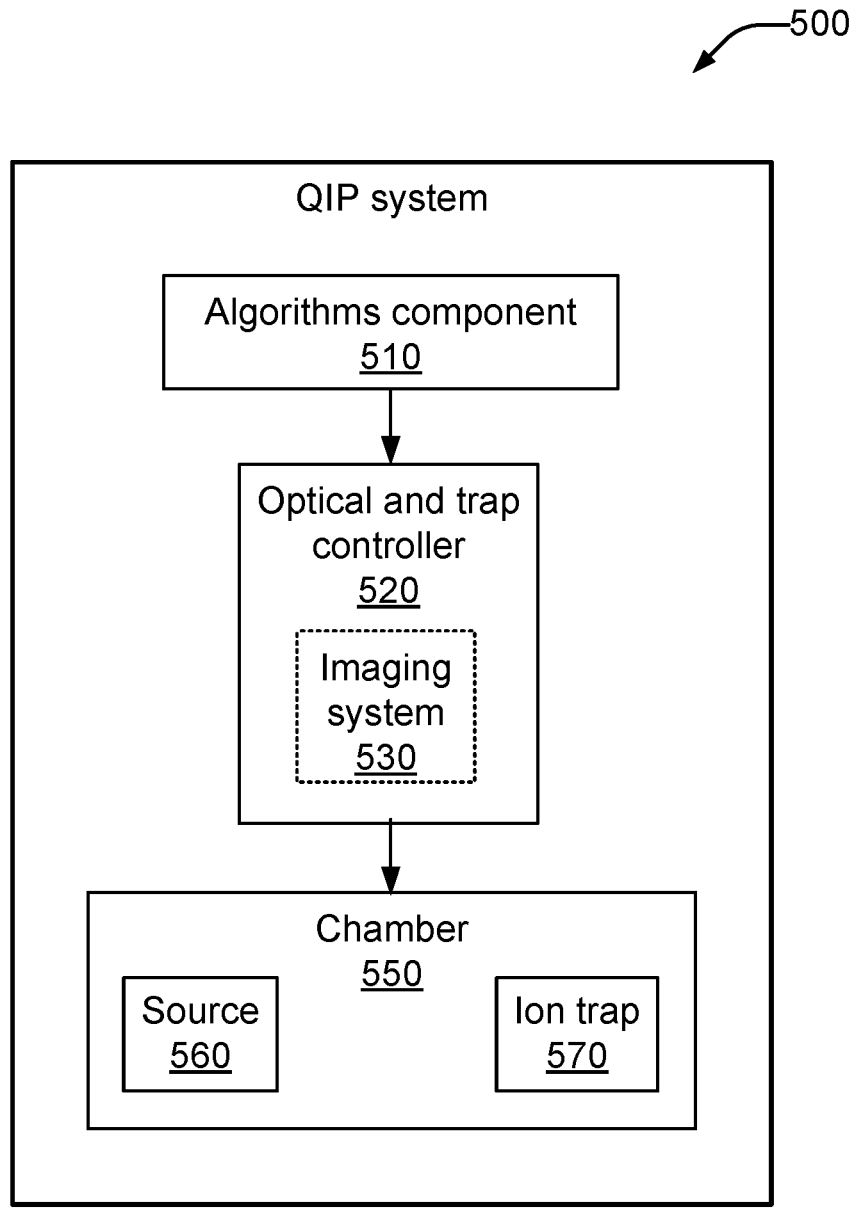
FIG. 5 illustrates an example of a quantum information processing (QIP) system in which an ion trap with the features described herein may be used in accordance with aspects of this disclosure.

FIG. 5 shows a block diagram that illustrates an example of a QIP system 500 in accordance with aspects of this disclosure in which multi-layer ion trap on shaped glass or dielectric substrate described herein can be implemented. The QIP system 500 may also be referred to as a quantum computing system, a computer device, a trapped ion system, or the like.

The QIP system 500 can include a source 560 that provides atomic species (e.g., a plume or flux of neutral atoms) to a chamber 550 having an ion trap 570 that traps the atomic species once ionized (e.g., photoionized). The source 560 may be implemented separate from the chamber 550. The ion trap 570 may be part of a processor or processing portion of the QIP system 500. The ion trap 570 may be an example of the multi-layer ion trap on shaped glass or dielectric substrate described herein. For example, the ion trap 570 may be structured and formed in accordance with the processes, methods, or techniques described above in connection with FIGS. 1A-2B. Additionally, the ion trap 570 may be shaped to include some or all of the features described above in connection with FIGS. 3A and 3B, such as trap 300.

The imaging system 530 can include a high-resolution imager (e.g., CCD camera) for monitoring the atomic ions while they are being provided to the ion trap or after they have been provided to the ion trap 570. In an aspect, the imaging system 530 can be implemented separate from the optical and trap controller 520, however, the use of fluorescence to detect, identify, and label atomic ions using image processing algorithms may need to be coordinated with the optical and trap controller 520.

The QIP system 500 may also include an algorithms component 510 that may operate with other parts of the QIP system 500 (not shown) to perform quantum algorithms or quantum operations, including a stack or sequence of combinations of single qubit operations and/or multi-qubit operations (e.g., two-qubit operations) as well as extended quantum computations. As such, the algorithms component 510 may provide instructions to various components of the QIP system 500 (e.g., to the optical and trap controller 520) to enable the implementation of the quantum algorithms or quantum operations.

Figure 6:
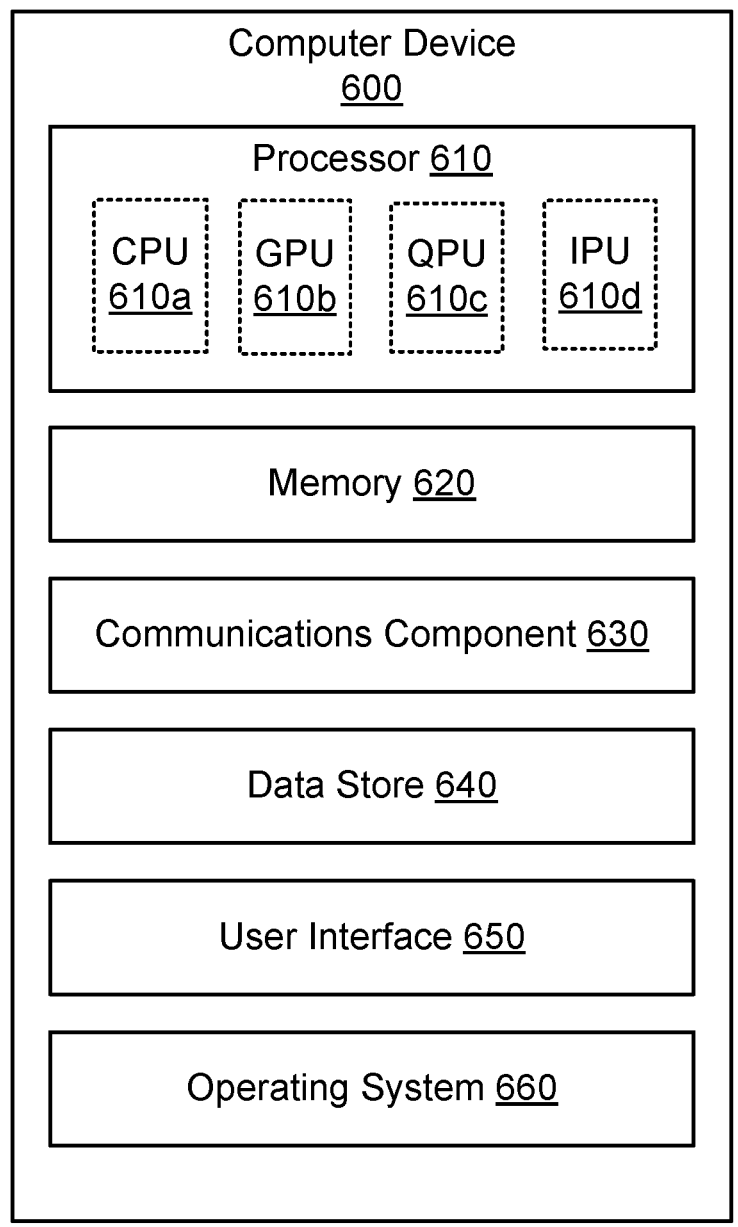
FIG. 6 illustrates an example of a computer device in which an ion trap with the features described herein may be used for quantum information processing in accordance with aspects of this disclosure.

Referring now to FIG. 6, illustrated is an example computer system or device 600 in accordance with aspects of the disclosure. The computer device 600 can represent a single computing device, multiple computing devices, or a distributed computing system, for example. The computer device 600 may be configured as a quantum computer (e.g., a QIP system), a classical computer, or a combination of quantum and classical computing functions. For example, the computer device 600 may be used to process information using quantum algorithms based on trapped ion technology and may therefore implement the multi-layer ion trap on shaped glass or dielectric substrate described herein. A generic example of the computer device 600 as a QIP system is illustrated in the QIP system 500 shown in FIG. 5.

The computer device 600 may include a processor 610 for carrying out processing functions associated with one or more of the features described herein. The processor 610 may include a single or multiple set of processors or multi-core processors. Moreover, the processor 610 may be implemented as an integrated processing system and/or a distributed processing system. The processor 610 may include one or more central processing units (CPUs) 610a, one or more graphics processing units (GPUs) 610b, one or more quantum processing units (QPUs) 610c, one or more intelligence processing units (IPUs) 610d (e.g., artificial intelligence or AI processors), or a combination of some or all those types of processors. In one aspect, the processor 610 may refer to a general processor of the computer device 300, which may also include additional processors 610 to perform more specific functions (e.g., including functions to control the operation of the computer device 600). The processor 610 may include an ion trap such as the multi-layer ion trap on shaped glass or dielectric substrate described herein. For example, the ion trap may be used in one or more of the QPUs 610c.

In an example, the computer device 600 may include a memory 620 for storing instructions executable by the processor 610 for carrying out the functions described herein. In an implementation, for example, the memory 620 may correspond to a computer-readable storage medium that stores code or instructions to perform one or more of the functions or operations described herein. Just like the processor 610, the memory 620 may refer to a general memory of the computer device 600, which may also include additional memories 620 to store instructions and/or data for more specific functions such as instructions and/or data for individual beam control.

Further, the computer device 600 may include a communications component 630 that provides for establishing and maintaining communications with one or more parties utilizing hardware, software, and services as described herein. The communications component 630 may carry communications between components on the computer device 600, as well as between the computer device 600 and external devices, such as devices located across a communications network and/or devices serially or locally connected to computer device 600. For example, the communications component 630 may include one or more buses, and may further include transmit chain components and receive chain components associated with a transmitter and receiver, respectively, operable for interfacing with external devices.

Additionally, the computer device 600 may include a data store 640, which can be any suitable combination of hardware and/or software, which provides for mass storage of information, databases, and programs employed in connection with implementations described herein. For example, the data store 640 may be a data repository for operating system 660 (e.g., classical OS, or quantum OS). In one implementation, the data store 640 may include the memory 620.

The computer device 600 may also include a user interface component 650 operable to receive inputs from a user of the computer device 600 and further operable to generate outputs for presentation to the user or to provide to a different system (directly or indirectly). The user interface component 650 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 650 may include one or more output devices, including but not limited to a display, a speaker, a haptic feedback mechanism, a printer, any other mechanism capable of presenting an output to a user, or any combination thereof.

In an implementation, the user interface component 650 may transmit and/or receive messages corresponding to the operation of the operating system 660. In addition, the processor 610 may execute the operating system 660 and/or applications or programs, and the memory 620 or the data store 640 may store them.

When the computer device 600 is implemented as part of a cloud-based infrastructure solution, the user interface component 650 may be used to allow a user of the cloud-based infrastructure solution to remotely interact with the computer device 600.

An aspect of this disclosure describes a QIP system (e.g., QIP system 500) that includes an ion trap having a substrate made of a glass material or a dielectric material, and a stack of multiple layers disposed over the substrate and including at least one metal layer for routing, at least one dielectric layer, and at least one metal layer for top electrodes, the substrate and the stack of multiple layers being shaped to form a hole that extends through the substrate and through the stack of multiple layers. The QIP system also includes a source configured to provide, from a back surface of the ion trap, atomic species that pass through the hole in the substrate and the stack of multiple layers of the ion trap to a top surface of the ion trap.

An aspect of this disclosure describes an ion trap having a substrate made of a glass material or a dielectric material; and a stack of multiple layers disposed over the substrate and including at least one metal layer for routing, at least one dielectric layer, and at least one metal layer for top electrodes, the substrate and the stack of multiple layers being shaped to form a hole that extends through the substrate and through the stack of multiple layers.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of fabricating a trap, comprising:
   preparing a back surface of a substrate for subsequent processing;
   building, after the preparation of the back surface of the substrate, a stack of multiple layers on a top surface of the substrate, the stack of multiple layers including at least one metal layer for routing and at least one metal layer for top electrodes; and
   shaping the substrate, after the stack of multiple layers is built on the top surface of the substrate, by processing the back surface of the substrate.

2. The method of claim 1, wherein the substrate is made of a glass material or a dielectric material.

3. The method of claim 1, wherein the substrate is made of fused silica.

4. The method of claim 1, wherein preparing the back surface of the substrate includes applying at least one laser writing step to prepare the back surface of the substrate for selective etching.

5. The method of claim 1, wherein preparing the back surface of the substrate includes partially shaping the substrate by removing, from the back surface of the substrate, a portion of the substrate.

6. The method of claim 5, wherein removing the portion of the substrate includes applying one or more laser writing steps and one or more etching steps.

7. The method of claim 5, wherein removing the portion of the substrate leaves a meniscus adjacent to the top surface of the substrate.

8. The method of claim 7, further comprising removing the meniscus.

9. The method of claim 8, wherein:
   building the stack of multiple layers includes disposing a protective layer over the stack of multiple layers, and
   removing the meniscus is performed after the protective layer is disposed over the stack of multiple layers.

10. The method of claim 1, wherein building the stack of multiple layers includes:
    disposing a first metallization over the top surface of the substrate,
    disposing a dielectric layer over the first metallization, and
    disposing a second metallization over the dielectric layer,
    wherein the first metallization is part of the at least one metal layer for routing and the second metallization is part of the at least one metal layer for top electrodes.

11. The method of claim 10, wherein disposing the dielectric layer includes forming vias in the dielectric layer to enable connections between the first metallization and the second metallization.

12. The method of claim 10, wherein disposing the first metallization includes patterning the first metallization to provide the routing.

13. The method of claim 10, wherein disposing the second metallization includes patterning the second metallization to provide the top electrodes.

14. The method of claim 10, wherein disposing the first metallization, disposing the second metallization, or both, include an electroplating process.

15. The method of claim 1, wherein:
    building the stack of multiple layers includes disposing a protective layer over the stack of multiple layers; and
    shaping the substrate by processing the back surface of the substrate includes removing, from the back surface of the substrate, a portion of the substrate to form a hole through a thickness of the substrate.

16. The method of claim 15, further comprising shaping the stack of multiple layers by removing a portion of the stack of multiple layers for the hole through the substrate to extend through the stack of multiple layers.

17. The method of claim 16, wherein the stack of multiple layers includes a dielectric layer with multiple dams, and the hole extending through the stack of multiple layers extends between the dams in the dielectric layer.

18. The method of claim 16, further comprising removing the protective layer.

19. An ion trap, comprising:
    a substrate made of a glass material or a dielectric material; and
    a stack of multiple layers disposed over the substrate and including at least one metal layer for routing, at least one dielectric layer, and at least one metal layer for top electrodes,
    wherein the substrate and the stack of multiple layers are shaped to form a hole that extends through the substrate and through the stack of multiple layers.

20. A quantum information processing system, comprising:
    an ion trap, the ion trap comprising:
        a substrate made of a glass material or a dielectric material, and
        a stack of multiple layers disposed over the substrate and including at least one metal layer for routing, at least one dielectric layer, and at least one metal layer for top electrodes,
        wherein the substrate and the stack of multiple layers are shaped to form a hole that extends through the substrate and through the stack of multiple layers; and
    a source configured to provide, from a back surface of the ion trap, atomic species that pass through the hole in the substrate and the stack of multiple layers of the ion trap to a top surface of the ion trap.

* * * * *